United States Patent [19]
Schutz

[11] Patent Number: 5,507,392
[45] Date of Patent: Apr. 16, 1996

[54] PALLET CONTAINER WITH ADAPTER FRAME

[75] Inventor: Udo Schutz, Selters, Germany

[73] Assignee: Schutz-Werke GmbH & Co. KG, Selters, Germany

[21] Appl. No.: 281,614

[22] Filed: Jul. 28, 1994

[30] Foreign Application Priority Data

Jul. 28, 1993 [DE] Germany .......................... 43 25 223.0

[51] Int. Cl.⁶ .................................................. B65D 19/00
[52] U.S. Cl. .......................... 206/600; 206/599; 220/401
[58] Field of Search ..................................... 206/599, 600, 206/386; 220/1.5, 401; 108/56.3; 280/43.24

[56] References Cited

U.S. PATENT DOCUMENTS

| | | | |
|---|---|---|---|
| 3,372,725 | 3/1968 | Voorhees | 220/401 X |
| 4,676,373 | 6/1987 | Schneider | 220/401 X |
| 4,817,824 | 4/1989 | LaFleur et al. | 206/600 X |
| 4,909,387 | 3/1990 | Schutz | 206/386 |
| 4,947,988 | 8/1990 | Schutz | 220/401 X |
| 5,058,747 | 10/1991 | DeCroix et al. | 206/599 |
| 5,156,268 | 10/1992 | Nichols | 206/386 |
| 5,253,763 | 10/1993 | Kirkley et al. | 206/600 |
| 5,253,777 | 10/1993 | Schutz | 206/386 X |
| 5,366,090 | 11/1994 | Schutz | 206/599 |

FOREIGN PATENT DOCUMENTS

| | | |
|---|---|---|
| 2202920 | 8/1973 | Germany. |
| 2442322 | 3/1976 | Germany. |
| 4237889 | 6/1993 | Germany. |

*Primary Examiner*—Bryon P. Gehman
*Attorney, Agent, or Firm*—Young & Thompson

[57] ABSTRACT

A pallet container (1), which is used as a single-use or multi-use container for the transport and storage of liquids of various types, has an outer jacket (2) made of criss-crossing vertical and horizontal lattice bars (3, 4) made of metal, a support insert (5), which can be used in the outer jacket, made of smooth wall parts made of plastic to support a replaceable, thin-walled inner container (6) made of plastic with a rectangular outline and rounded corners, which has a filler neck (7) that can be sealed by a screw cap (8) and a drain neck (9) to connect a drain valve (10). A sealing cover (11), mounted on the lattice jacket (2) and the support insert (5), is made of plastic or sheet metal. A steel pallet (12) that can be handled by a forklift truck or a storage and retrieval unit for high-bay warehouses or the like, supports the inner container (6), the support insert (5), and the lattice jacket (2). For empty transport and storage purposes, the steel pallet (12) contains a stowage space for the lattice jacket (2) and support insert (5) in the collapsed state.

5 Claims, 5 Drawing Sheets

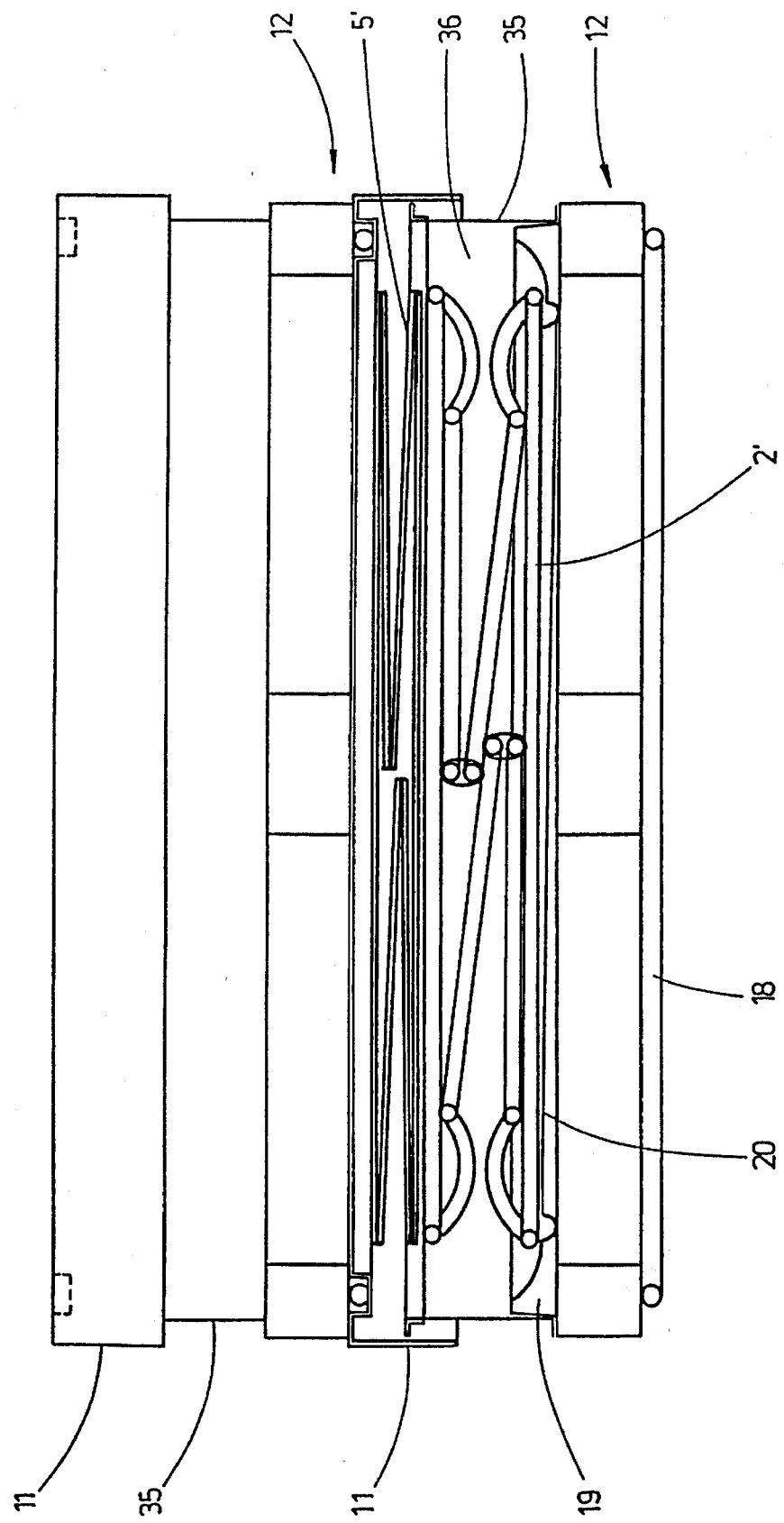

PALLET CONTAINER WITH ADAPTER FRAME

BACKGROUND OF THE INVENTION

The invention relates to a pallet container, which is used as a single use and multi-use container, with a bottom tray made of sheet metal or plastic, which has a drain bottom and is secured to a pallet frame made of metal, plastic or wood that can be handled by a forklift truck, a storage and retrieval unit for high-bay warehouses or the like, a collapsible outer jacket made of a metal lattice or sheet metal, which is detachably fastened to the pallet, and a support insert, adjoining the outer jacket, made of wall parts that can be collapsed to form a package; the pallet container can be used as desired either for transport and storage of liquids with a thin-walled plastic inner container adjoining the support insert, which has a drain bottom and fits snugly within the bottom tray of the pallet or can be equipped with an inner pocket made of plastic foil or fabric for transport and storage of bulk goods and, after the inner tank with the support insert is removed, can be used to transport and store parceled goods. Such a pallet container is known from DE 42 37 889 A1.

The need to use raw materials sparingly and the legal environmental protection regulations require that the relevant industry decant liquids for transport and storage in large-volume pallet containers of generic type designed as commercially available reusable tanks instead of, as was done in the past, in drums of significantly smaller capacity.

SUMMARY OF THE INVENTION

The object of the invention is to improve the generic pallet container in such a way that for empty transport and storage purposes, it can be folded together simply and quickly into a compact unit requiring minimal space and can also be quickly and simply put back together again for transport and storage of liquid, bulk, or parceled goods.

The pallet container according to the invention is distinguished by the following advantages:

The simple folding design of the outer lattice jacket and the support insert and the incorporation of a stowage space into the pallet make it simple and quick to put the components of the pallet container together to form a compact unit, which requires a minimal amount of space for empty transport and storage of the container and consequently results in low transport and storage costs. The collapsed container can again be set up and ready for operation quickly and simply as well. If need be, the pallet container can be equipped with a thin-walled plastic inner container for transport and storage of liquid goods or an inner pocket made of a plastic foil or fabric for transport and storage of bulk goods. With the support insert made of wall plates, the pallet container is suitable for the transport and storage of parceled goods and semi-finished products of various types. The collapsed, compact container unit can be stacked several units high due to the corresponding design of the sealing cover for the stowage space of the pallet. Finally, the wall thickness of the inner container can be significantly reduced due to the fact that the plastic inner container is braced with a support insert made of wall plates and thus plastic compositions contaminated with dyes, paints, or similar environmentally hazardous liquids are considerably reduced, so that disposal of these plastic compositions by incineration is not a problem.

BRIEF DESCRIPTION OF THE DRAWINGS

The invention is explained below based on the accompanying drawings, wherein:

FIG. 4 shows a container in section, collapsed into a compact unit, with a container unit stacked upon it.

DETAILED DESCRIPTION OF THE DRAWINGS

Figure 1:
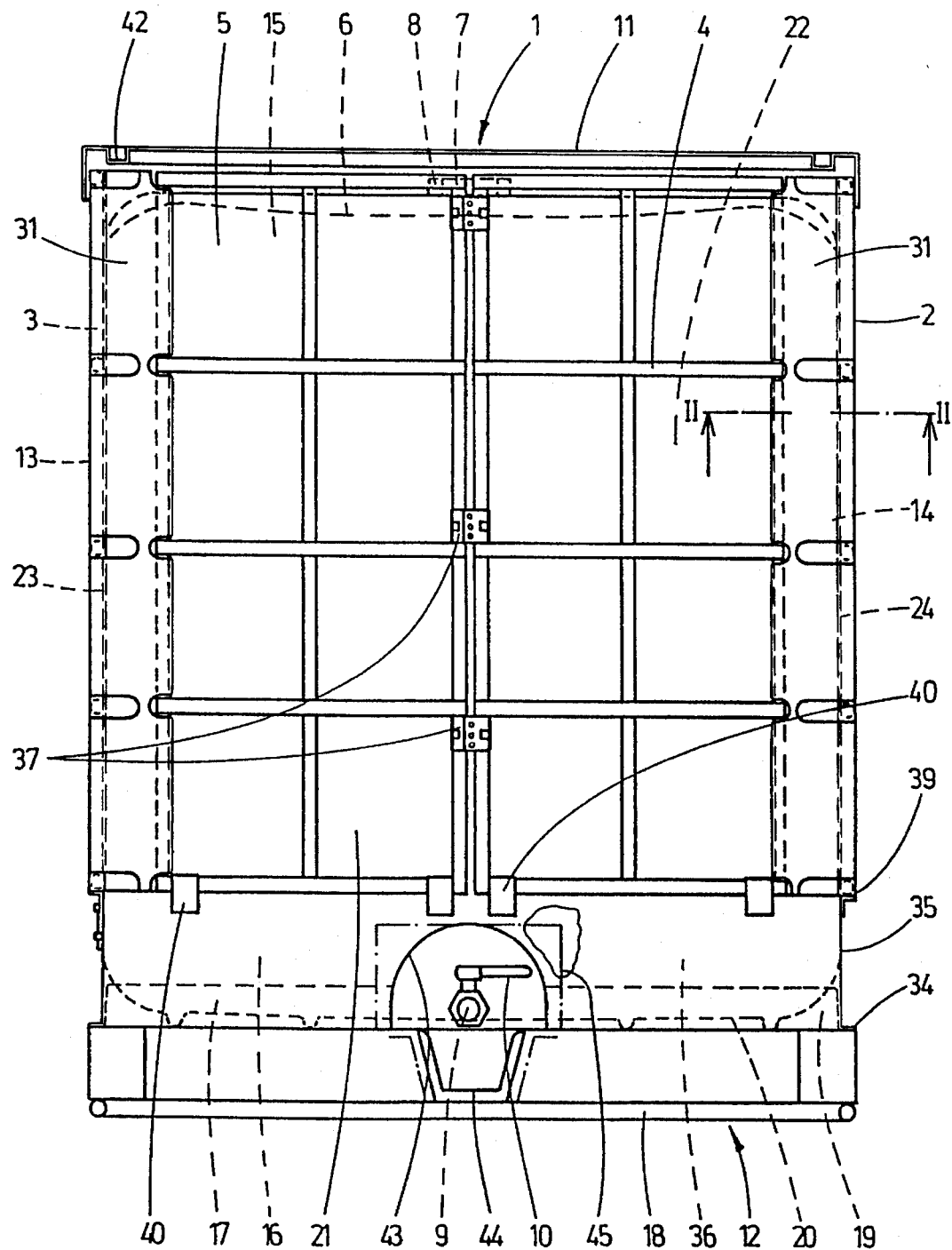
FIG. 1 is a front view of a pallet container with an inner container.
Figure 2:
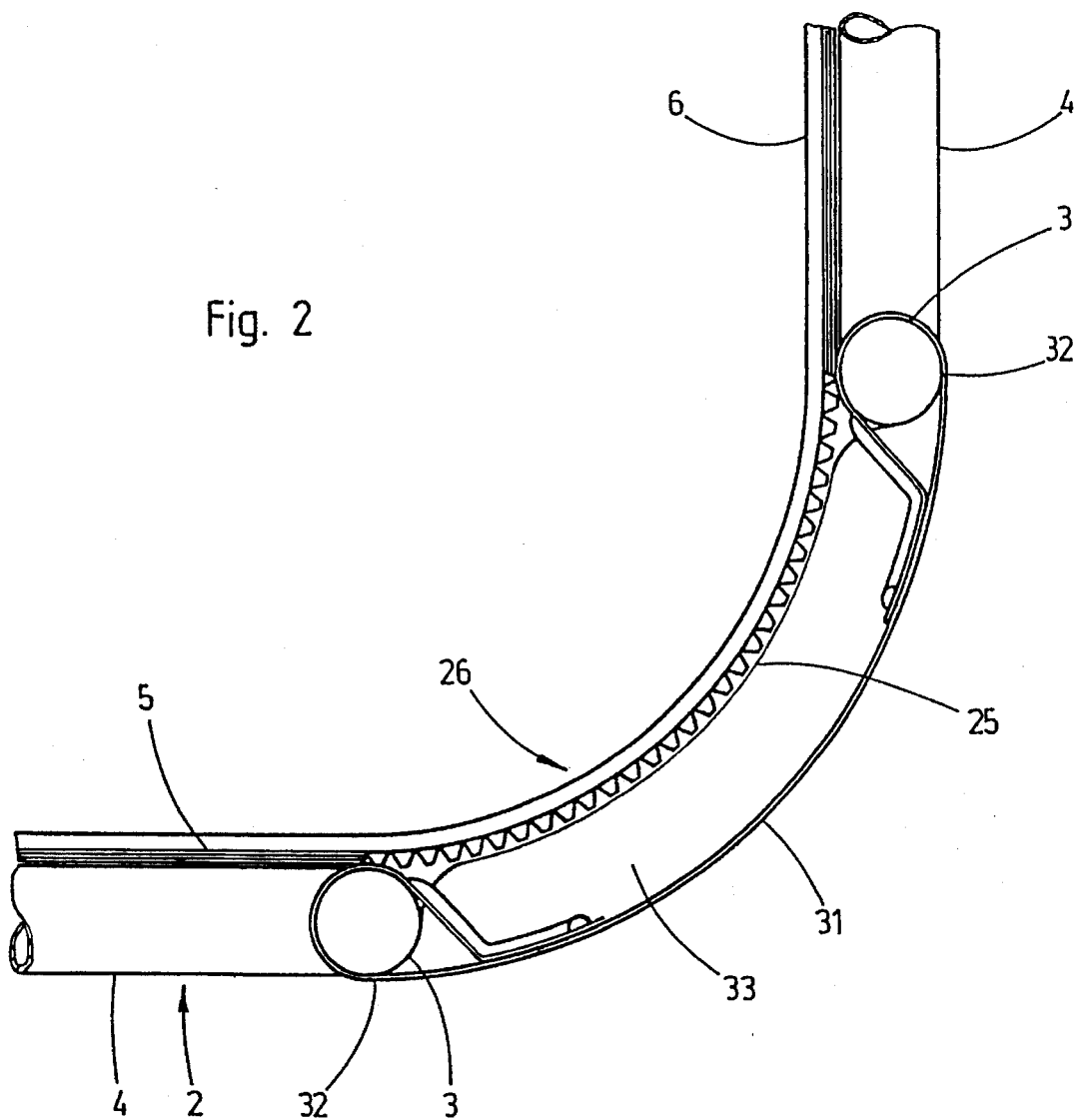
FIG. 2 is an enlarged partial section along line II—II of FIG. 1.

Pallet container 1, which is a multi-use container, according to FIGS. 1 and 2 for the transport and storage of liquids of various types, has as main components an outer jacket 2 made of criss-crossing vertical and horizontal lattice bars 3, 4 made of metal, a support insert 5, which can be used in the outer jacket, made of smooth wall parts made of plastic for a replaceable, thin-walled inner container 6 made of plastic, preferably polyethylene, with a rectangular outline and rounded corners, which is equipped with a filler neck 7 that can be sealed with a screw cap 8 and a drain neck 9 to connect a drain valve 10, a sealing cover 11, mounted on lattice jacket 2 and support insert 5, made of plastic or sheet metal, and a steel pallet 12 that can be handled by a forklift truck, a storage and retrieval unit for high-bay warehouses or the like, with length and width dimensions meeting European Standards for holding inner container 6, support insert 5, and lattice jacket 2.

Plastic inner container 6, which is produced as a blown part, with a drain bottom 17, which slopes slightly from side walls 13, 14 and from back wall 15 toward drain valve 10 in front wall 16, is snugly accommodated by bottom tray 19, which is fastened to a pallet frame 18, with a bottom 20 adapted to bottom 17 of inner container 6. Bottom tray 19 of pallet 12 is made from sheet metal as a deep-drawn part.

Smooth wall parts 21–24 of support insert 5, which are extruded from plastic, are connected to one another by flexible joint frames 25, which are matched to rounded corner areas 26 of thin-walled inner container 6 (FIG. 2), and front wall part 21 and rear wall part 22 are additionally designed to be able to fold in the center.

Support insert 5 can be extruded integrally as a plate, in which case the plate is divided into wall parts 21–24 by strips that are reduced in thickness, which form joint frames 25. To increase flexibility, slots or grooves can be pressed into joint frames 25.

The possibility further exists of extruding or pressing wall parts 21–24 of support insert 5 as separate plates made of plastic and connecting the plates by the flexible plastic strips that form joint frames 25.

Four lattice walls 27–30 of collapsible outer jacket 2 are connected to one another by rounded sheet-steel corner plates 31 with hinges 32 attached to the latter, and the shape of sheet-steel corner plates 31 is matched to the rounded shape of corner areas 26 of plastic inner container 6 and to joint frames 25 of support insert 5 adjoining inner container 6. Sheet-steel corner plates 31 are reinforced by pressed-in beads 33.

An adapter frame 35 made of sheet steel is fastened to outer edge 34 of flat bottom tray 19 of pallet 12; said frame contains a stowage space 36 for accommodating lattice jacket 2 and support insert 5 in collapsed state 2' and 5', when pallet container 1 in the empty state is collapsed into a compact unit for transport and storage purposes (FIG. 4).

Figure 5:
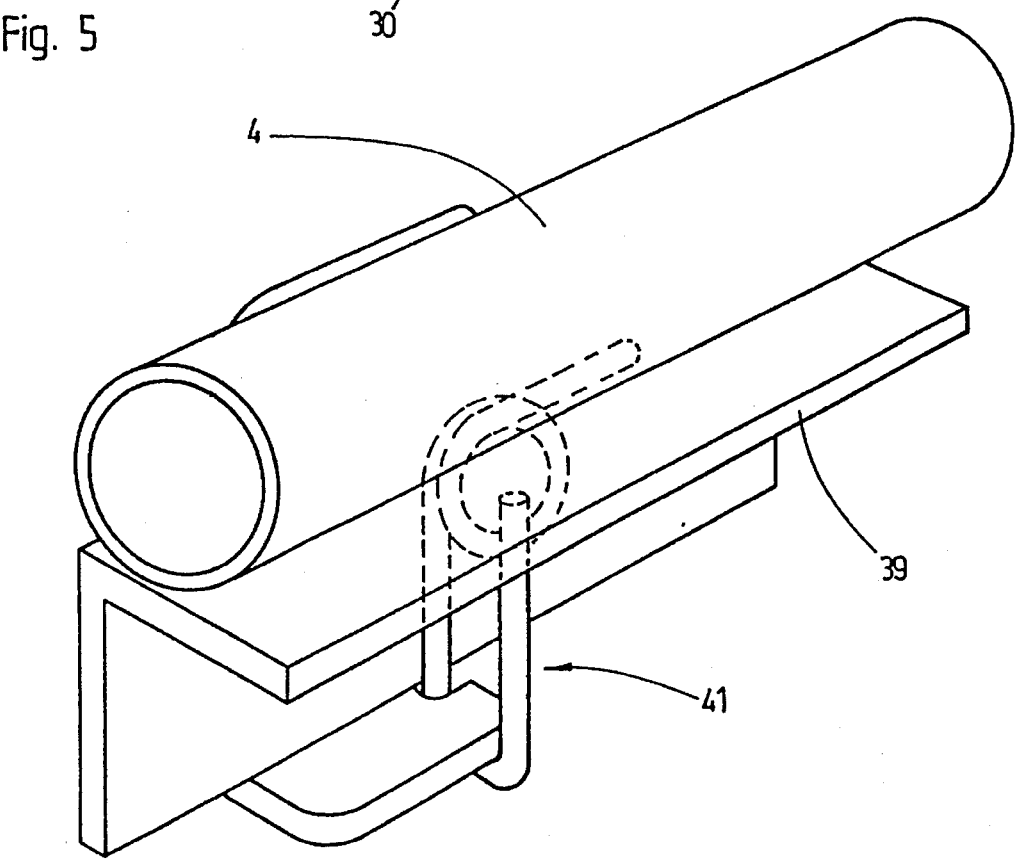
FIG. 5 shows a closure for the front and rear lattice walls of the outer jacket that can be folded up on the adapter frame of the pallet.
Figure 6:
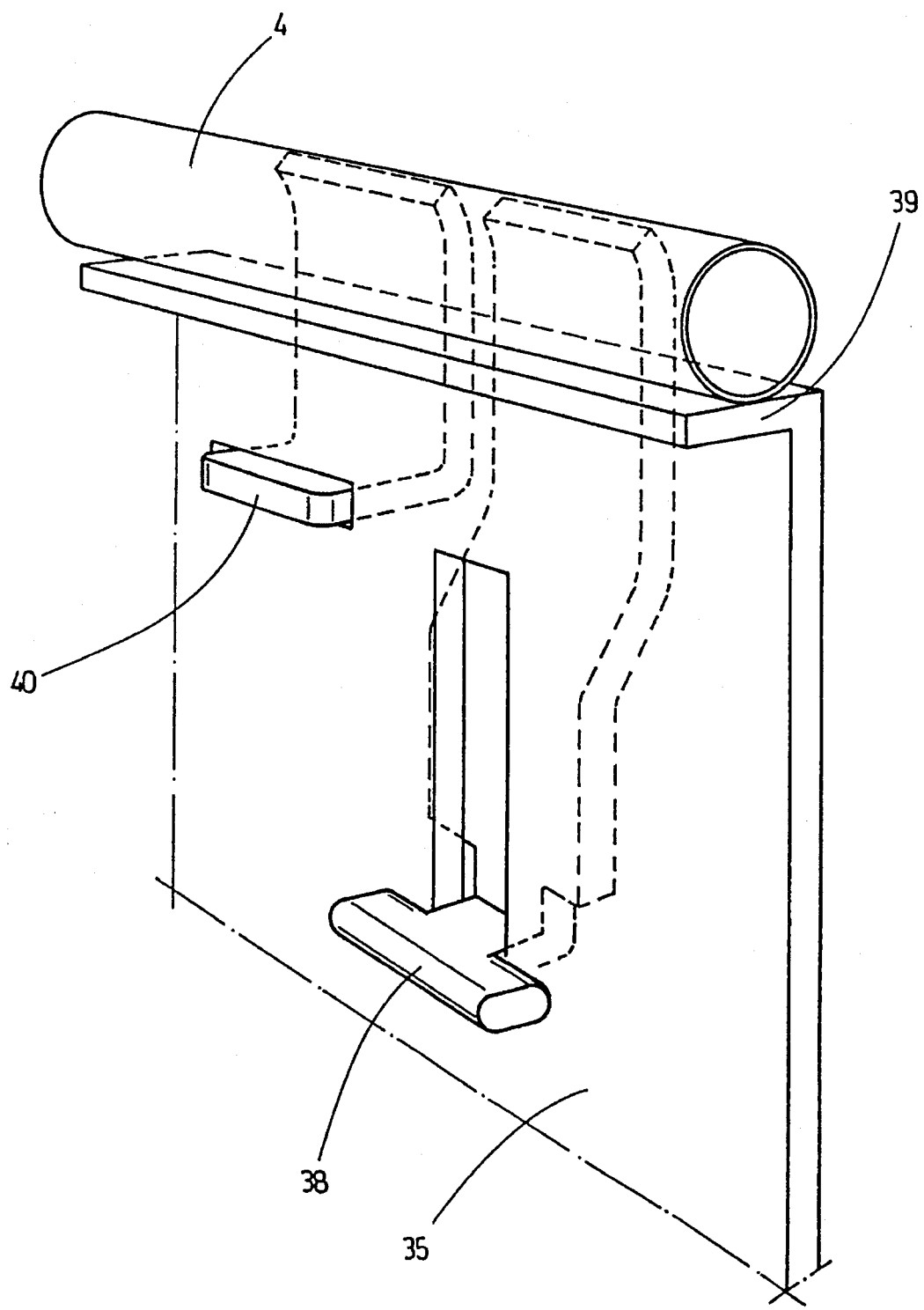
FIG. 6 shows a movable hinge for pivotable fastening of a longitudinal wall of the outer lattice jacket to the adapter frame of the pallet in enlarged representation.

Front lattice wall 27 and rear lattice wall 28 of outer jacket 2 are divided in the center, and respective wall halves 27a, 27b and 28a, 28b are connected to one another by hinges 37. One side wall 29 of lattice jacket 2 is swivel-mounted by means of movable hinges 38 to a long section of upper edge 39 of adapter frame 35 of bottom tray 19 of pallet 12 (FIG. 6). The other side wall 30 or both side walls 29, 30 as well as wall halves 27a, 27b and 28a, 28b of front lattice wall 27 and of rear lattice wall 28 of outer jacket 2, are fastened by means of detachable claws 40 to the two long and the two short sections of upper edge 39 of adapter frame 35 (FIG. 5). Front wall 27 and rear wall 28 of lattice jacket 2 are secured to upper edge 39 of adapter frame 35 by detachable closures 41.

Figure 3:
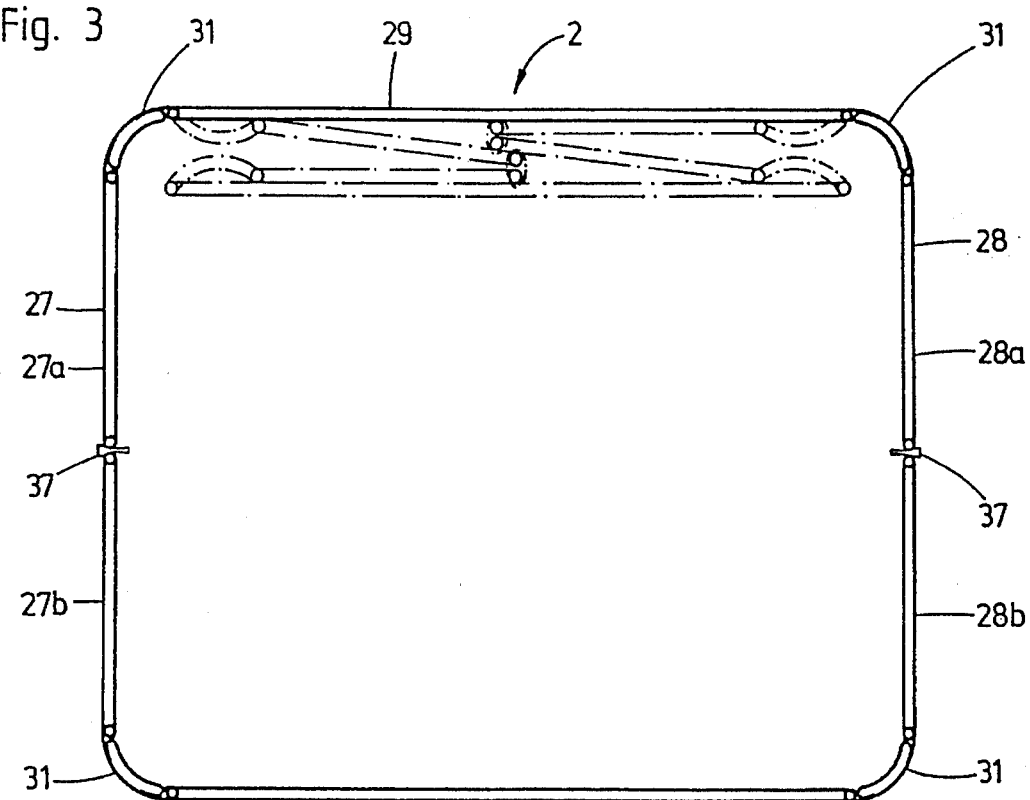
FIG. 3 is a top view of the erected lattice jacket and the collapsed lattice jacket before it is folded into the stowage space of the pallet.

When collapsing pallet container 1, empty inner container 6 and then support insert 5 are first lifted out from lattice jacket 2. Then, support insert 5 is folded up. After closures 41 of lattice walls 27, 28 are unlocked, the latter as well as side wall 30 of lattice jacket 2 are pressed inward, and as a result fastening claws 40 of lattice walls 28, 28; 30 are detached from upper edge 39 of adapter frame 35, so that lattice jacket 2 can be folded upright against one lattice wall 29 (FIG. 3). Collapsed lattice jacket 2 can now be folded into a horizontal position in stowage space 36 of pallet 12. Collapsed support insert 5 is placed on lattice jacket 2, and finally stowage space 36 is closed by cover 11.

During operation, cover 11 is used to close the transport and stowage space of pallet container 1 formed by lattice jacket 2 and support insert 5. In addition to sealing cover 11, lattice jacket 2 is reinforced with an upper frame made of diagonal supports, not shown.

A peripheral groove 42 for accommodating pallet frame 18 of a stacked, collapsed container unit is molded on the top side of sealing cover 11 (FIG. 4).

Without plastic inner container 6, pallet container 1 can be used for the transport and storage of parceled goods and semi-finished goods of various types. In this application of the pallet container, a plastic tray can be used in addition in the sheet-steel bottom tray of the container.

For transport and storage of bulk goods, the plastic inner container of the pallet container is replaced with an inner bag made of a plastic foil or fabric.

For transport and storage of bulk goods and parceled goods, access opening 43 provided for drain valve 10 of plastic inner container 6 in adapter frame 35 of pallet 12 and center base 44 of pallet frame 18 which is open toward the front are closed in the outlet area under drain valve 10 by a plate 45 or a hinged lid.

What is claimed is:

1. Pallet container for use as a disposable and reusable container, comprising:

a bottom tray having an outer edge, a drain bottom, and being made of one of sheet metal and plastic, said bottom being secured to a pallet made of one of metal, plastic, and wood designed for handling by a forklift truck;

a collapsible outer jacket detachably mounted on the pallet, and made of a metal lattice work, said outer jacket having front, side and rear lattice walls;

a support insert adjoining the outer jacket, said support insert having wall parts which can be collapsed into a package;

an adapter frame secured to the outer edge of the bottom tray and enclosing a stowage space for accommodating both the outer jacket and support insert when collapsed;

said lattice walls being joined to one another by rounded corner plates having hinges, and the shape of the corner plates is matched to a rounded shape of corner areas of an inner container and to flexible joint frames of said support insert within which is disposed said inner container;

said front and rear lattice walls each being divided in the center, and respective wall halves being connected to one another by hinges;

a side wall of said outer jacket being swivel-mounted by means of movable hinges on a longitudinal section of an upper edge of the adapter frame;

detachable claws for fastening another side wall and wall halves of the front and rear lattice walls to two longitudinal sections and two short sections of the upper edge of the adapter frame; and a cover for closing the storage space when both the outer jacket and support insert are collapsed.

2. A pallet container according to claim 1, wherein the top side of the cover includes a peripheral groove for accommodating a pallet frame of a stacked, collapsed pallet container.

3. A pallet container according to claim 1, wherein the wall parts of the support insert are connected to one another by flexible joint frames which are matched to the rounded corner areas of the inner container, and wall parts which are opposite to each other are each foldable at their center.

4. A pallet container according to claim 1, further comprising detachable closures for the front wall and rear wall of the outer jacket on the upper edge of the adapter frame.

5. A pallet container according to claim 1, further comprising a plate for closing an access opening provided for a drain valve of the inner container in the adapter frame and center base of the pallet that is open toward the front in an outlet area under the drain valve during transport of parcel goods and bulk goods.

\* \* \* \* \*